UNITED STATES PATENT OFFICE.

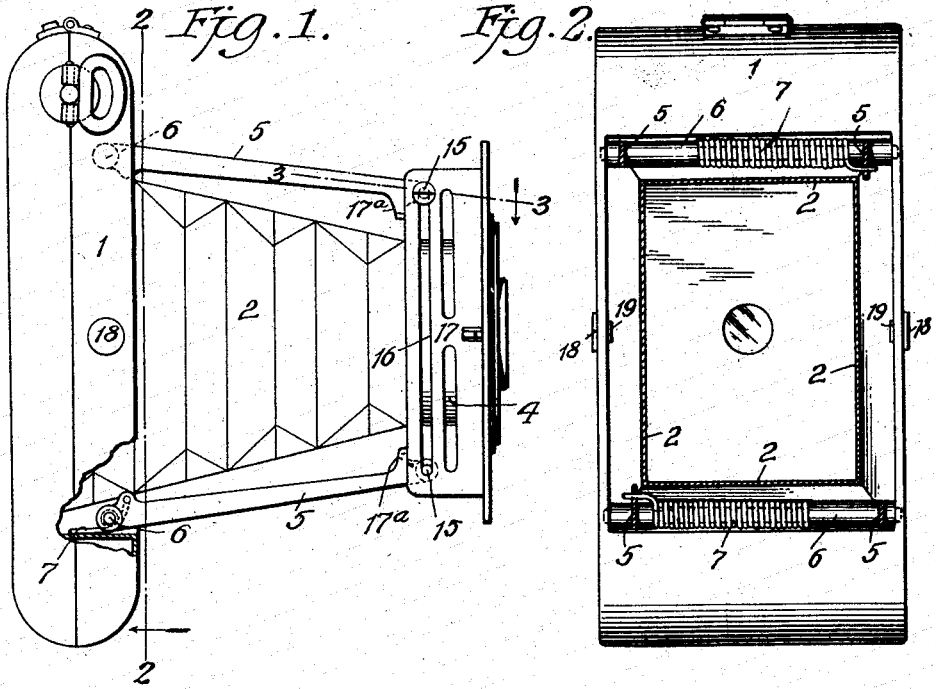
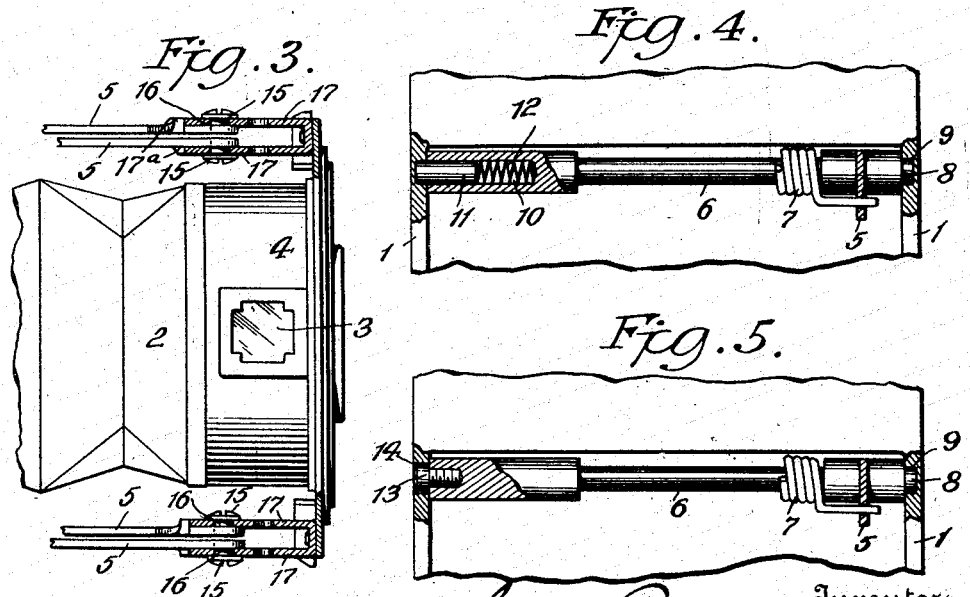

CARL BORNMANN, OF BINGHAMTON, NEW YORK, ASSIGNOR TO ANSCO COMPANY, OF BINGHAMTON, NEW YORK, A CORPORATION OF NEW YORK.

CAMERA.

1,213,067.  Specification of Letters Patent.  Patented Jan. 16, 1917.

Application filed May 6, 1916. Serial No. 95,762.

*To all whom it may concern:*

Be it known that I, CARL BORNMANN, a citizen of the United States, and a resident of the city of Binghamton, county of Broome, and State of New York, have invented certain new and useful Improvements in Cameras, of which the following is a specification, reference being had to the accompanying drawings.

This invention, while especially adapted to small folding or collapsible cameras, is also adapted to cameras of larger sizes.

The purpose of the invention is to provide a folding camera with means whereby the lens and co-acting parts will be automatically brought to proper position for making exposures by simply pressing suitable push buttons or otherwise releasing the confining devices.

Referring to the drawings, Figure 1 is a side elevation of a camera embodying my invention; Fig. 2 is a front view, partly in section, on the line 2—2 of Fig. 1, looking in the direction of the arrow; Fig. 3 is a plan view of the forward part of the bellows and co-acting parts partly in section and on the line 3—3 of Fig. 1, looking in the direction of the arrow; Figs. 4 and 5 are views, partly in elevation and partly in section, illustrating details of construction.

In the drawings, 1 represents the body of the camera, 2 the bellows, 3 (see Fig. 3) the finder, 4 the lens and shutter casing, 5, 5, the arms which support the lens casing, the forward end of the bellows, etc. The rear or inner ends of these arms 5 are supported upon two posts 6, 6, which extend transversely across the camera adjacent to but in front of the spool chambers.

7 are springs which encircle the posts 6, one end of each of which takes a bearing upon one of the arms 5, the other end upon some suitable rigid part of the structure in a manner well known. These posts may be journaled in the frame of the camera box in such manner as preferred, but I have found the following methods desirable.

Referring first to the construction shown in Fig. 4, a bearing 8 will be made upon one end of each post adapted to enter into and properly engage in a recess 9 made in the frame. The other end of the post will be suitably bored as at 10 to receive a plunger 11 supported upon a spring 12, the arrangement being such that the spring will normally project the plunger in such manner as to cause its outer end, to engage in a suitable recess made in the frame to act as a journal for that end of the post. It will be noted that under this construction the post can be readily inserted during the assembling of the camera.

Another method is illustrated in Fig. 5, in which one end of the post is provided with the same projecting bearing 8 entering a recess in the frame as before, but the other end of the post has a threaded hole made therein, in which a screw 13 threads, which screw passes through a hole 14 made in the frame of the camera, the edges of the head of the screw being preferably squared, so as to constitute a bearing for that end.

The arms 5, 5, are provided at their outer ends with headed pins, or their equivalent, 15, which move through slots 16 made in a U-shaped bracket 17 fastened to the frame or front board of the lens casing. It will be noted that the screws illustrated in Fig. 3 may be beneficially used as and for the pins 15, and that the screw or pin which pertains to one of the arms 5 moves through the slot 16 made in one member of the U-shaped bracket while the pin or screw that pertains to the companion arm 5 moves through a similar slot in the opposite member of the U-shaped bracket. The arms at their outer or swinging ends are each provided with a rectangular shoulder 17ª (see Figs. 1 and 3) which bear respectively against the exposed edges of the respective members of the U-shaped bracket and thus co-acting with the springs 7, automatically cause the lens casing and co-acting parts to assume and maintain a correct position parallel with the focal plane.

18 (see Figs. 1 and 2) are suitable latches or confining devices, in the instance shown, spring actuated push buttons, which appearing upon the outside of the camera have a lip or latch like part 19 within the camera which engage with suitable parts of the movable front board or lens casing when the camera is folded or collapsed and thus hold it closed.

The operation is as follows: The camera being folded or collapsed, when it is desired to make an exposure the push buttons 18, or their equivalents, are manipulated in such manner as to release the forwardly projectable parts. Thereupon the springs 7, 7, exerting their action upon the arms 5, 5, immediately project the lens and shutter casing and the bellows, which are attached thereto, during which operation the pins 15 move respectively through their appropriate slots 16 made in the U-shaped bracket 17. When the limit of movement has been reached, the little shoulders 17ª on the swinging ends of the arms take their bearing, as described, against the edges of the U-shaped bracket and insure the proper position of the lens casing and shutter mechanism relative to the focal plane.

It will be noted that this operation is practically instantaneous, without any care on the part of or act to be performed by the operator. The exposure may thereupon be made. The possibility of thus rapidly removing the camera from the pocket of the operator and quickly adjusting it for proper and successful use is of great value, especially to those persons who have occasion to use cameras of this class under peculiar circumstances, as, for instance, for detective work, or police work, in the taking of snap shots of sporting events, and in many other instances where no time is allowed for the arrangement and orderly adjustment of the apparatus.

I claim:

1. In a folding camera provided with a bellows, lens casing and co-acting parts, spring actuated arms pivotally supported at one end upon the camera body and slidably engaged at their other end with the lens supporting structure and adapted to project the lens and bellows, and means upon the camera body to hold the parts when closed against the stress of the springs.

2. In a folding camera provided with a bellows, lens casing and co-acting parts, spring actuated arms pivotally supported at one end upon the camera body and engaging the lens casing at their other ends, shoulders on the free ends of the arms adapted when extended to engage some part of the lens casing and thus determine the position of the lens as projected, and means upon the camera body to hold the parts when closed against the stress of the springs.

3. In a folding camera provided with a bellows, lens casing and co-acting parts, spring actuated arms pivotally supported at one end upon the camera body and engaging the lens casing at their other ends, slotted brackets on the lens casing, pins on the free ends of the arms which work in the slots of the brackets and means upon the camera body to hold the parts when closed against the stress of the springs.

4. In a folding camera provided with a bellows, lens casing and co-acting parts, spring actuated arms pivotally supported at one end upon the camera body, U-shaped brackets upon the lens casing, each member of which brackets is slotted, a pin upon the free end of each arm, which works in the slot in one of the members of each U-shaped bracket and means upon the camera body to hold the parts when closed against the stress of the springs.

5. In a folding camera provided with a bellows, lens casing and co-acting parts, spring actuated arms pivotally supported at one end upon the camera body and engaging the lens casing at their other ends, shoulders upon the free ends of the arms which automatically cause the lens casing and co-acting parts to assume and maintain positions parallel to that of the focal plane of the camera and means upon the camera body to hold the parts when closed against the stress of the springs.

In testimony whereof I have signed my name to this specification.

CARL BORNMANN.